United States Patent
MacPherson et al.

(10) Patent No.: US 10,906,624 B1
(45) Date of Patent: Feb. 2, 2021

(54) MARINE WASTE WATER DUMP CONTROL SYSTEM

(71) Applicants: Earl MacPherson, Dania, FL (US); James Coats, Sea Ranch Lakes, FL (US)

(72) Inventors: Earl MacPherson, Dania, FL (US); James Coats, Sea Ranch Lakes, FL (US)

(*) Notice: Subject to any disclaimer, the term of this patent is extended or adjusted under 35 U.S.C. 154(b) by 0 days.

(21) Appl. No.: 15/597,073

(22) Filed: May 16, 2017

Related U.S. Application Data

(63) Continuation-in-part of application No. 13/419,902, filed on Mar. 14, 2012, now abandoned.

(60) Provisional application No. 61/452,359, filed on Mar. 14, 2011.

(51) Int. Cl.
| | |
|---|---|
| *B63J 4/00* | (2006.01) |
| *E03F 1/00* | (2006.01) |
| *G01S 19/14* | (2010.01) |
| *B63B 79/00* | (2020.01) |

(52) U.S. Cl.
CPC .............. *B63J 4/00* (2013.01); *E03F 1/001* (2013.01); *G01S 19/14* (2013.01); *B63B 79/00* (2020.01); *B63J 4/004* (2013.01); *B63J 4/006* (2013.01)

(58) Field of Classification Search
USPC .................. 137/236.1, 565.11; 114/121, 125
See application file for complete search history.

(56) References Cited

U.S. PATENT DOCUMENTS

| | | | | |
|---|---|---|---|---|
| 4,932,006 A | * | 6/1990 | Delignieres | G01S 1/72 324/263 |
| 6,826,514 B1 | * | 11/2004 | Antico | G01D 9/005 702/188 |
| 7,603,210 B2 | * | 10/2009 | Reynolds | G05B 23/0264 114/125 |
| 10,145,832 B2 | * | 12/2018 | Fukuzawa | G01N 27/06 |

(Continued)

*Primary Examiner* — Jessica Cahill
*Assistant Examiner* — Daphne M Barry
(74) *Attorney, Agent, or Firm* — David P. Lhota, Esq.; Lhota & Associates, P.A.

(57) ABSTRACT

A marine waste water dump control system for noncommercial nonmetallic or fiberglass boats that provides a system and process for automatically monitoring the time, exact location, and quantity of blackwater, greywater or bilgewater (marine water waste) is dumped from such a water vessel and for requesting and receiving approval or disapproval for dumping marine water waste into restricted or unrestricted waters, including oil water and the like. The instant invention has an MS (Automatic Information System) or comparable communication system that operates at approximately 160 MHz for determining the exact distance from shore and communicating with marine authorities, such as the Coast Guard, before activating the dump control system and communication. The dump control system of the instant invention automatically stores all dumping related information in memory for access by authorities at any time in the event a vessel does not include an AIS or a working AIS. The instant invention also determines from existing shoreline beacons and a triangulation method the exact distance a water vessel is from the shore. The system may be applied to any and all holding tanks on a marine vessel containing pollutants such as black water, gray water, bilge water, oil water and the like.

18 Claims, 4 Drawing Sheets

(56) References Cited

U.S. PATENT DOCUMENTS

| | | | |
|---|---|---|---|
| 10,261,063 B2 * | 4/2019 | Stuer-Lauridsen | B63J 99/00 |
| 2003/0176971 A1 * | 9/2003 | Daniels | B63J 99/00 702/2 |
| 2005/0016933 A1 * | 1/2005 | Perlich | B63J 4/002 210/754 |
| 2005/0155539 A1 * | 7/2005 | Randall | C02F 1/008 114/125 |
| 2009/0211507 A1 * | 8/2009 | Fielding | B63J 4/004 114/125 |
| 2010/0072144 A1 * | 3/2010 | Osakabe | C02F 1/76 210/752 |

* cited by examiner

MARINE WASTE WATER DUMP CONTROL SYSTEM

CROSS-REFERENCE TO RELATED APPLICATION

This application is a continuation-in-part of application Ser. No. 13/419,902 filed Mar. 14, 2012 which claims the benefit of provisional patent application Ser. No. 61/452,359 filed Mar. 14, 2011.

STATEMENT REGARDING FEDERALLY SPONSORED RESEARCH OR DEVELOPMENT

N/A

FIELD OF THE INVENTION

This invention relates generally to a marine waste water dump control system, and more particularly, to a marine waste water dump control system for automatically monitoring, recording and reporting the time, location and distance from the coast where untreated blackwater, greywater, bilge-water, oil-water dumping or other contaminated water as well as the quantity of waste water dumped from marine vessels, such as boats, yachts and other noncommercial water vessels that dump waste water into the world's ocean and waterways. The instant invention is designed for use with nonmetallic marine vessels, such as fiberglass boats and yachts.

BACKGROUND OF THE INVENTION

Waste dumped from water vessels, such as ships and yachts, may comprise black water, gray water, bilge water, oil or other contaminated waste, generally referenced herein as waste water. Blackwater waste includes sewage, greywater waste is from showers, sinks and laundry washing machines and bilge water wastes comes from bilges. Under current laws and regulations, waste dumping from water vessels cannot be done until a vessel is a certain distance away from the coast, such as three miles, or without prior permission from the Coast Guard in emergency situations. However, these laws and regulations are routinely violated because violators cannot determine their distance from the coast with any accuracy or because of indifference to the laws. Accordingly, there are concerns over the environmental quality of the world's oceans and waterways and they continue to grow, in part, because of the inability to reliably monitor and record the dumping of waste from vessels. These concerns are based on the increasing problem of water vessels dumping contaminated waste from vessels into protected and unprotected water without any reliable way of tracking or monitoring such illegal dumping. In addition, vessels are not able to determine with reliable accuracy their distance from the coast or exactly when they enter legal waters for dumping and do not have any reliable way to determine other issues, such as cap removal.

The United States and many other countries are attempting to restrict this practice with the threat of criminal penalties and fines if operators are caught dumping waste into protected waters, but the cost of policing the waters is high and the percentage of violators caught is low. Despite the fact that most marine vessels are fitted with an Automatic Information System (AIS), these systems are not adapted or used to transmit this information to the required authorities. AIS is included in the International Convention for the Safety of Life at Sea (SOLAS), and large ships began fitting AIS in July 2002. AIS provides a means for ship to ship and ship to shore communications and provides a means for to promulgate different types of information of interest. More specifically, MS is a communications device that uses the Very High Frequency (VHF) radio broadcasting system to transfer packets of data over the VHF data link (VDL) and enables AIS equipped vessels and shore-based stations to send and receive identification information that can be displayed on an electronic chart, computer display or compatible radar. MS currently has two dedicated frequencies; AIS 1 (161.975 MHz) and MS 2 (162.025 MHz). AIS transmitted information helps in situational awareness and provides a means to assist in collision avoidance. In addition, AIS may be used as an aid to navigation, by providing location and information on buoys and lights. AIS, however, is not used for transmitting information or data regarding location or distance from shore, waste water data on a vessel, requests for off shore dumping in restricted waters, confirming dumping in unrestricted water and data regarding the monitoring and the dumping of waste water. The use of AIS for requesting, authorizing, forbidding and, or monitoring off shore dumping in restricted waters or unrestricted waters or for insuring dumping in unrestricted water would solve the problem of illegal dumping in restricted waters. If a system existed that could automatically and accurately monitor the time, location and distance from the coast, and quantity and type of waste dumped from a vessel and provide authorization for dumping utilizing AIS, it would alleviate this problem with illegal waste dumping and allow law enforcement to more effectively monitor and approve waste dumping from water vessels.

There are systems known in the background art that remotely monitor bilge water processing in separating oil from water and ocean dumping, provide offshore sewage treatment and handling systems and that use dyes to mark unauthorized waste water discharges. U.S. Pat. No. 6,444,119, issued to Mains, Jr., discloses a bilge water processing system for remote monitoring and control to process oil-contaminated water and exchange commands and data with a remote facility. The system includes a separation system, controller and a communication unit. The controller is coupled to the separation system and is operable to acquire data relating to processing of oil-contaminated water and can utilize commands received by the communication system to permit remote control of the separation system. The system can also include a global position system which can be used by the controller to inhibit the discharge of contaminated liquids when the ship is in protected waters. Mains Jr. primarily addresses remote monitoring and a separator system for primarily treating water contaminated with oil before dumping the cleaned water into the ocean. In addition, Mains Jr. relies on a global positioning system to determine global position of a vessel at any one time in latitude and longitude coordinates, but does not and cannot determine with any reliability a vessel's distance from land, a distance that must be known to ensure compliance with dumping laws. U.S. Pat. No. 6,165,371, issued to Allen, discloses an offshore sewage treating and handling apparatus and method for accommodating and handling excess deliveries of combined sewage overflows to a sewage treatment plant contained within an offshore moored vessel or platform, by diverting the excess deliveries to ballast tanks for temporary displacement of clean ballast water and to be returned to the treatment system when excess deliveries of combined sewage overflow are relieved. U.S. Pat. No. 5,265,640, issued to St. Amant, discloses a system for marking unauthorized liquid waste and waste water discharges that includes a supply for containing a dye tracer product within the confines of an industrial plant or bilge for ships, an interface line for adding the dye product, a valve controller for valving the flow of dye product between the supply tank and the discharge line, and an activating device for activating the valve controller responsive to the sensing of a preset level of liquid waste product flow being discharged via the discharge line so that unauthorized discharges of waste material via the discharge line automatically activates the valve controller to mix a dye product contained within the supply tank with the unauthorized fluid discharge.

A variety of other systems are known that handle and, or treat bilge water, waste water, sewage and related water vessel pollutants, however, they fail to address or effectively resolve the issues with offshore dumping from water vessels. For instance, U.S. Pat. No. 7,059,261, issued to Randall, discloses a wastewater ballast system and method that includes the steps of collecting wastewater, treating the collected wastewater, storing the treated wastewater, and discharging the treated wastewater during ballast operations. U.S. Pat. No. 6,555,012, issued to Femholz et al., discloses a method and composition for the treatment of blackwater collection systems for use in removing and preventing buildup of blackwater deposits in blackwater collection/treatment systems. U.S. Pat. No. 5,803,778, issued to Hardy, discloses a method and apparatus for handling waste consisting of a floating receiving station with receiving apertures projecting from the receiving station to receive containers of human waste which have been stored on a boat. As the boat approaches the receiving station, the waste may be placed within the receiving aperture and thereby prevent the pollution of water. U.S. Pat. No. 5,474,672, issued to Peterson et al., discloses a bilgewater purification device to remove petroleum substances from pumped bilgewater in small boats. U.S. Pat. No. 5,433,842, issued to Morris et at, discloses a marine sewage treatment system that includes a tank for receiving successive charges of liquid and solid waste material and a water conduit that conducts heated water from the vessel's engine through the tank to heat the contents thereof above the level at which coliform bacteria can survive. U.S. Pat. No. 5,381,751, issued to Richards et al., discloses a deep ocean relocation system that includes a transport vehicle (glider) and a quad riser assembly for transporting waste for disposal at abyssal depths. The transport vehicle is either self-powered or towed by a host vehicle, and travels at the water surface or underwater to the disposal site. U.S. Pat. No. 4,886,607, issued to Lalonde et al., discloses an apparatus for filtering, retaining and disposal of waste water accumulated on a boat. The apparatus consists of a tank, a device for controlling the flow of waste water from the tank and a depth measuring instrument that provides a depth signal and a signal generating device operable to generate a discharge signal in response to the depth signal. U.S. Pat. No. 4,324,007, issued to Morris, discloses a macerator/ejector pump within a waste material holding tank on a boat that liquefies solid waste material in the tank and pumps the liquefied waste material through a discharge line adapted for connection to an onshore waste collection system. U.S. Pat. No. 3,882,552, issued to Turner, discloses a waste treatment system designed for use on a marine vessel or land-based vehicle that includes a housing enclosing a bowl having a valve which closes an opening in the bottom thereof. U.S. Pat. No. 6,256,809, issued to Goldschmidt et al., discloses a waste prevention system which avoids the discharge of laboratory waste into a public sewage system. U.S. Pat. No. 7,143,363, issued to Gaynor et al., discloses a method for displaying marine vessel information automatically and selects a chosen visual display based on the magnitudes of one or more vessel-related parameters, such as engine speed, gear selector position, or vessel velocity.

Ballast water monitoring systems are also known in the art. Ballast water is used to help balance and stabilize a ship by moving water in and around a ship. For instance, U.S. Pat. No. 6,823,810, issued to Carlson et al. ("Carlson) discloses a wireless ballast water monitoring and reporting system and marine voyage data recorder system. Carlson specifically discloses and claims an acoustic modem system for transmitting ballast tank information through the metal structure of a ship. The acoustic modems in Carlson operate in the audible frequency range, which is generally accepted as 20-20,000 Hz, and less than 30 kHz. Carlson discloses in column 5 the use of modems that send sound pulses of approximately 20-200 kHz at one second intervals. U.S. Patent Publication 2006/0191456, filed by Randall ("Randall"), discloses a waste water ballast system and method that filters and treats water before it is moved to a ballast tank or discharged. FIG. 4 of Randall refers to dumping seawater ballast when a certain number of miles in open water, which only addresses seawater, not waste water. There is also no disclosure regarding the monitoring, reporting, requesting or restricting of waste water dumping within any distance from land. In addition, Randall only discloses and addresses filtering, treating and de-ballasting treated water. Accordingly, Carlson and Randall fail to address monitoring, recording, reporting and requesting the dumping of waste water in identified waters and determined distances from land using AIS for communication and GPS coordination and without the use of acoustic modems or other modem sensors.

The foregoing patent references fail to teach an accurate and effective marine waste dump control system that monitors, records, and reports the time, location and distance from shore when dumping and the quantity of waste water, such as untreated blackwater, greywater, bilge-water or oil water, dumped with reliability and using a communication system that operates without acoustic modems or similar modems and in a frequency range well above 200 kHz, such as in MS. The water dumping systems known, such as Carlson and Randall, only address ballast water systems using acoustic modems. Therefore, there exists a need for a waste water dump control system for water vessels that automatically monitors the time, GPS location and quantity of waste dumped from a vessel. There also exists a need for such a system that allows authorities to grant or deny authorization to dump and track the same. It is, therefore, to the effective resolution of the aforementioned problems and shortcomings of the prior art that the present invention is directed. The instant invention addresses this unfulfilled need in the prior art by providing a waste water dump control system as contemplated by the instant invention disclosed herein.

SUMMARY OF THE INVENTION

In light of the foregoing, it is an object of the present invention to provide a marine waste water dump control system that automatically monitors and records the dumping of untreated blackwater, greywater, bilge-water, oil-water or other contaminated water, generally referenced herein as waste water, from water vessels, such as non-metallic or fiberglass boats and yachts.

It is also an object of the instant invention to provide a marine waste dump control system that automatically or manually reports waste water dumping from water vessels to government authorities, such as the Coast Guard.

It is another object of the instant invention to provide a marine waste dump control system that determines with accuracy the location and distance a vessel is from the coast to insure compliance with laws and regulations for waste water dumping before authorizing and performing a dump from a water vessel.

It is an additional object of the instant invention to provide a marine waste dump control system that monitors, determines, records and reports the amount of waste dumped from a marine vessel.

It is a further object of the instant invention to provide a marine waste dump control system that determines if an unauthorized marine waste dumping is needed because of safety concerns, seeks authorization for the "illegal" dumping from law enforcement, such as the Coast Guard, and records the location, distance from coast and amount of dumping for reporting to authorities.

It is yet another object of the instant invention to provide a marine waste dump control system that uses a triangulation method with existing onshore beacons to accurately determine a vessel's distance from the coast.

It is yet an additional object of the instant invention to provide a marine waste dump control system that can be applied to any and all holding tanks on a water vessel containing pollutants such as blackwater, greywater, bilge-water, oil-water or other contaminants.

It is a yet a further object of the instant invention to provide a marine waste dump control system that monitors and controls the dumping of waste water and not ballast water. The instant invention does not address, monitor or control ballast water.

In light of these and other objects, the instant invention comprises a marine waste water dump control system that provides a system and process for automatically monitoring the time, GPS location, and quantity of waste dumped from a water vessel and for requesting and receiving approval or disapproval for dumping marine water waste into restricted or unrestricted waters, including black water, gray water, bilge water, oil water and the like. In accordance with the instant invention, vessels having an AIS (Automatic Information System) that operate above the audio frequency range and in the very high frequency range above thirty megahertz (30 MHz) and preferably above one hundred and sixty megahertz (160 MHz). The AIS of the in the instant invention may operate at designated AIS frequencies of 161.975 MHz or 162.025 MHz. In alternative embodiments, comparable communication systems for communicating with marine authorities, such as the Coast Guard, would use the dump control system and their communication system to transmit dumping related information to the required authorities. The dump control system of the instant invention automatically stores all dumping related information in memory for access by authorities at any time in the event a vessel does not include an AIS or a working AIS. The instant invention also determines from existing shoreline beacons and a triangulation method the exact distance a water vessel is from the shore or coastline. The system may be applied to any and all holding tanks on a marine vessel containing pollutants such as black water, gray water, bilge water, oil water and other contaminants, generally, collectively or individually referenced herein as waste or waste water.

In accordance with one aspect, the present invention provides a marine waste or waste water dump control system having a pump and controller which monitors a number of sensors including a tank level sensor placed in a holding tank and a cap lock sensor to monitor whether and when the holding tank cap is removed to allow the tank to be pumped out by a waste management service. The controller also takes information from a GPS receiver to determine time and global position of the vessel. A shutoff valve is used by the controller to prevent any waste from being dumped from the vessel. A flow meter is used to measure the amount of waste pumped from the holding tank and exiting a drain pipe. The flow meter and tank level sensor are used together to confirm the amount of waste pumped from the vessel. When the shutoff valve is open, the pump can be turned on to pump waste from the holding tank. Data including the date, time, global position, and quantity of waste water to be dumped or dumped are transmitted to the responsible authorities via the MS radio. The instant invention includes software, code or set of instructions readable and processed by a microprocessor or other processor in or operated by or in the controller.

In another aspect, the present invention provides a the present invention provides a marine waste or waste water dump control system including a controller, processor readable code of instructions or software operated by or in the controller, memory, holding tank containing untreated blackwater, greywater, bilge-water or oil, holding tank level sensor, cap lock sensor, pump for pumping waste from the holding tank, one or more actuators, GPS receiver for determining the global position or location of the water vessel, shutoff valve for preventing dumping from the water vessel, flow meter for measuring the amount of waste pumped from the holding tank and tank level sensor for determining the amount of waste in the holding tank and pumped from the holding tank. The controller may communicate with the holding tank level sensor, cap lock sensor, flow meter, tank level sensor, pump and actuators over wired or hard wired connections for compatibility with a plurality of boat constructions including metal, fiberglass or wood. The GPS and AIS devices of the instant invention preferably use radio communications, which are above the audio frequency range used by acoustic modems known in the prior art, and preferably in the very high frequency (VHF) range between 30 MHz and 300 MHz.

In an additional aspect, the present invention provides a marine waste or waste water dump control system including a controller, processor and processor readable code of instructions, such as software, having a main control loop that begins by enabling a shutoff valve and turning off a pump to prevent waste or waste water from being dumped from the vessel. If the controller determines the GPS position of the vessel is within restricted waters or cannot be determined, the system could be enabled to allow some waste to be dumped up to an unauthorized limit without exceeding the unauthorized limit. Otherwise, when unauthorized dumping is not allowed, the system of the instant invention restricts all dumping if the GPS position is not available, the vessel is in restricted waters, or the MS radio contact is not available. When operating under standard or normal conditions, if the vessel is determined to be outside of restricted waters and AIS communications is available, the operator or controller first determines how much waste must be dumped and the system of the instant invention then sends an MS request to the proper authorities to seek authorization for the dumping. Once the system receives a positive acknowledgement from the authorities authorizing the dumping of the requested amount of waste, the system proceeds to disable the shutoff valve so as to prepare for the dumping and turns on the pump until the desired amount of waste has been pumped from the holding tank on the vessel. Once the desired amount of waste has been pumped from the vessel, data on the date, time, location, and quantity of waste that was dumped from the vessel is recorded in the logging memory of the controller or vessel computer and transmitted to the authorities via the AIS radio. The system continues to send the AIS dumping data until an acknowledgement that the transmitted data has been received.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

With reference to the drawings in which like reference designators refer to like elements, FIGS. 1 to 6 depict the preferred embodiment of the instant invention which is generally referenced as a marine waste water dump control system, dump control system, system and, or by numeric character 10. The marine waste water dump control system 10 of the instant invention provides a system and process for automatically monitoring the time, GPS location, and quantity of waste dumped from a water vessel and for requesting and receiving approval or disapproval for dumping marine water waste into restricted or unrestricted waters, including black water, gray water, bilge water, oil water and the like. In accordance with the instant invention, vessels having an AIS (Automatic Information System) or comparable communication system for communicating with marine authorities, such as the Coast Guard, would use the dump control system 10 and their communication system to transmit dumping related information to the required authorities. The dump control system 10 of the instant invention automatically stores all dumping related information in memory for access by authorities at any time in the event a vessel does not include an AIS or a working MS. The instant invention 10 also determines the exact distance from a shore line to ensure they are dumping in legal waters or to report where they dumped in emergency situations to the Coast Guard or other governing body. The system 10 may be applied to any and all holding tanks on a marine vessel containing pollutants such as black water, gray water, bilge water, oil water and the like.

Figure 1:
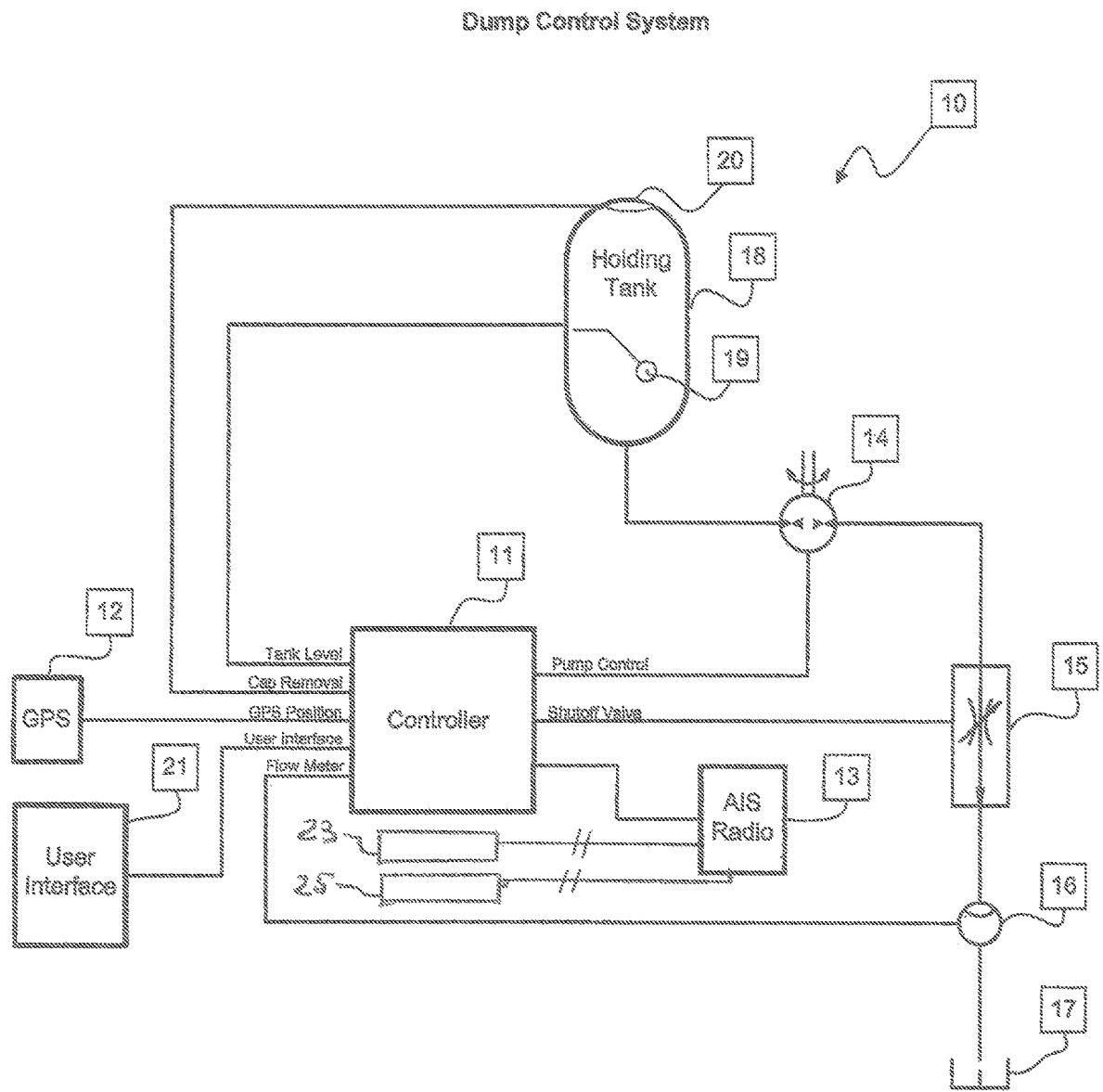
FIG. 1 is a block diagram of the waste water dump control system in accordance with the preferred embodiment of the instant invention.

With reference to FIGS. 1-6, the marine water waste dump system 10 comprises a microprocessor based controller 11, GPS receiver 12, AIS radio transceiver or comparable communication system 13 (referenced herein as an MS radio), pump 14, shutoff valve 15, flow meter 16, drain pipe 17, at least one waste water holding tank 18, holding tank waste water level sensor 19 in the tank 18, cap lock sensor 20, user interface 21, system control software 100, holding tank pump monitoring software 200, holding tank leak monitoring software 300 and message monitoring software 400. The MS communication system 13 also comprises software and hardware for communicating with on-shore communication beacons 23, 25 and determining the exact distance from shore using a triangulation computation method. The software 100-400 comprises processor readable codes of instruction that are read and processed by the controller 11. With reference to FIG. 1, the controller 11 processes the software 100-400 to monitor the tank level sensor 19, cap lock sensor 20, user interface 21, and flow meter 16 and to communicate with, monitor and, or control the GPS receiver 12, MS radio 13, pump 14 and shut off valve 15. The controller 11 monitors the tank level sensor 19 to determine the level of waste water in the holding tank 18 and initiate commands based on the level as further described herein. The controller 11 monitors the cap lock sensor 20 to determine whether the holding tank cap is removed to allow the tank 18 to be pumped out by a waste management service. The controller 11 also takes information from the GPS receiver 12 to determine time and global position of the vessel. The controller 11 enables the shutoff valve 15 to prevent any waste from being dumped from the marine vessel and disenables it to allow dumping. This could happen automatically in unrestricted waters or when authorization is given to perform limited dumping in restricted waters. The flow meter 16 measures the amount of waste pumped from the holding tank 18 and exiting the drain pipe 17 and the measurements are processed and stored in the internal memory of the controller 11. The flow meter 16 and tank level sensor 19 are used together to confirm the amount of waste pumped from the vessel, which again is processed and stored in the memory of the controller 11 for transmission via the MS radio 13 or later access by authorities. When the shutoff valve 15 is open, the pump 14 can then be enabled to pump waste from the holding tank 18 out the drain pipe 17 into the water. Information on the date, time, global position, and quantity of waste are stored in the controller 11 and transmitted to the responsible authorities via the MS Radio 13. The AIS 13 also includes a triangulation software package and communication hardware for determining the distance from each beacon 23, 25 and using triangulation software to compute the exact distance a vessel is from the shore line at the time of dumping. The type of waste dumped from the holding tank, i.e. black water, gray water, bilge water or oil water, may also be stored and transmitted. The GPS 12 may perform any type of communications which are used to locate global positioning of a marine vessel or to provide information to and from the vessel. The controller 11 may be secured with tamperproof seals to prevent any access to the data.

Figure 2:
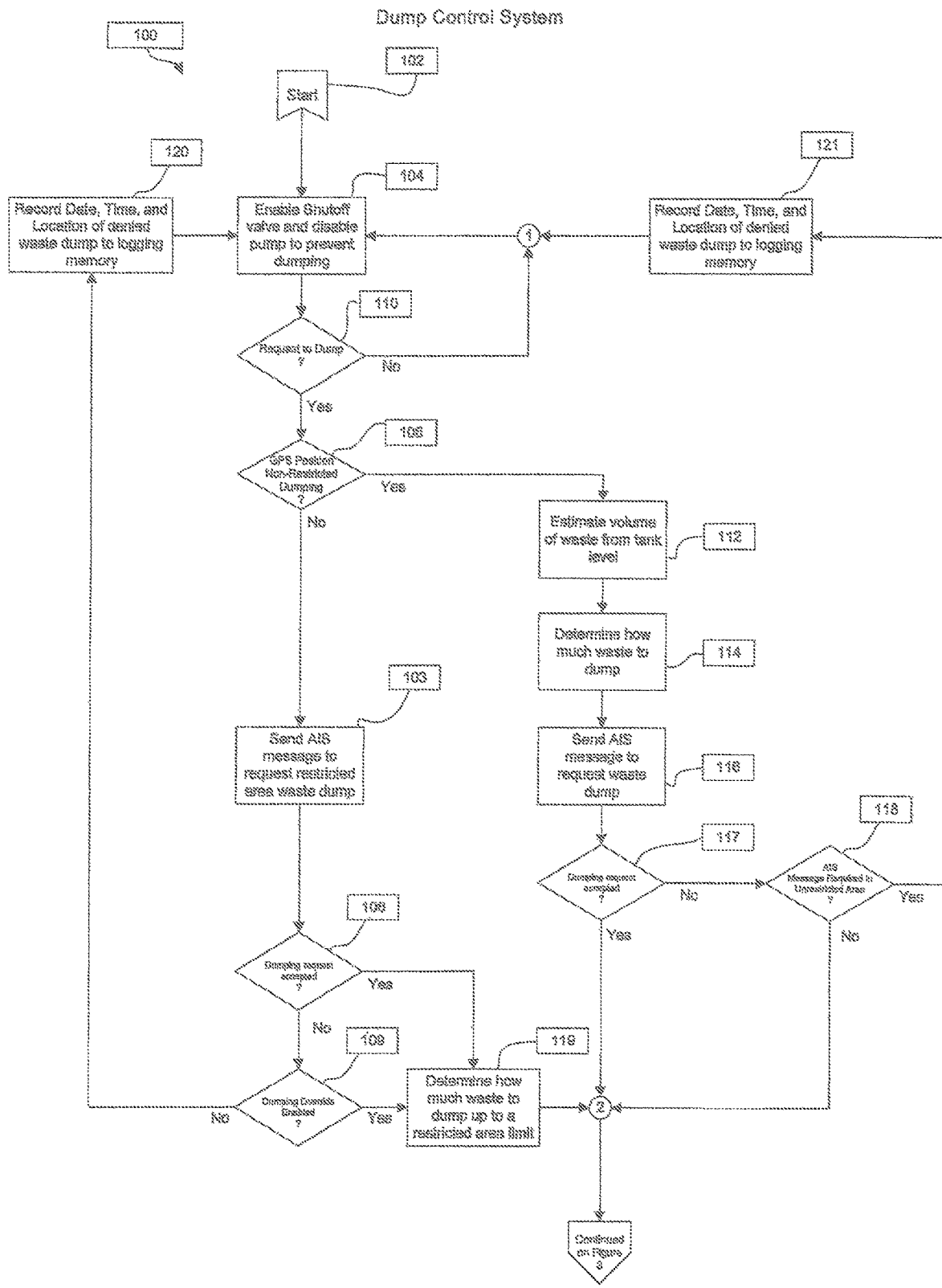
FIG. 2 and FIG. 3 show a flow diagram of the logic software of the controller operation and process of the waste water dump control system in accordance with the preferred embodiment of the instant invention shown in FIG. 1.
Figure 3:
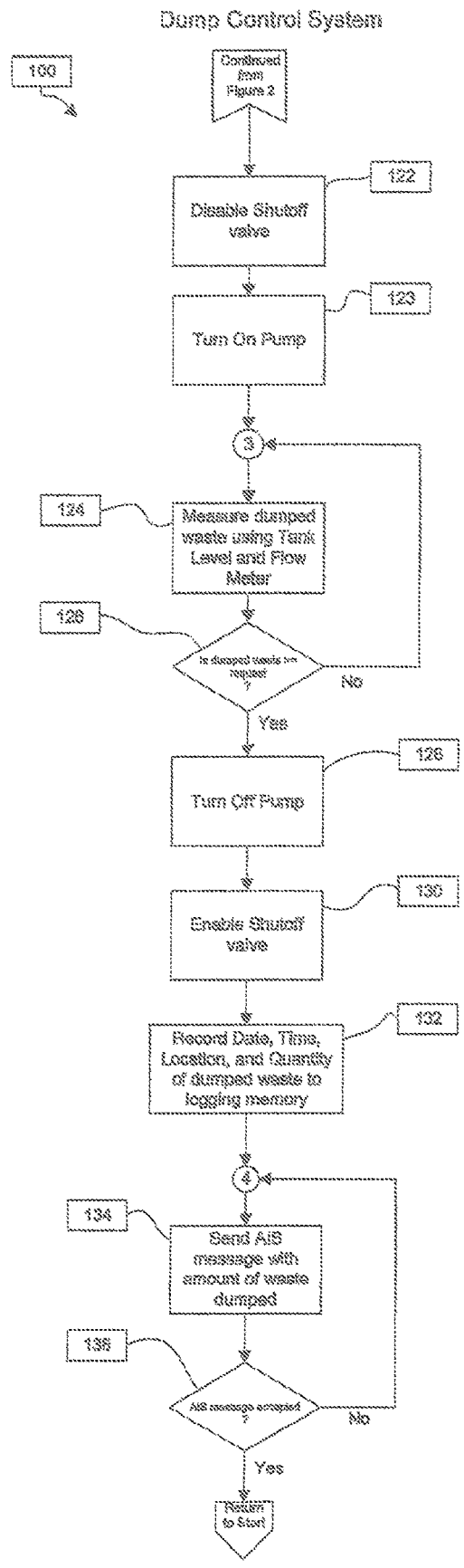

Now referring to FIG. 2 and FIG. 3, the system control software 100 for operation of the controller 11 comprises a series of steps and inquires that dictate operation as shown. The main control loop begins by starting the program (102) and then enabling the shutoff valve 15 and disabling the pump 14 to prevent waste from being dumped from the holding tank 18 out the vessel (104). The control software 100 also monitors inputs to determine whether a user request has been made through the user interface 21 to dump waste from the vessel (110). If a dump has been requested, the software 100 determines whether the vessel is in restricted waters or there exists dumping restrictions (106). If it is determined that the GPS position of the vessel is within restricted waters or its position cannot be determined, the control system software 100 sends an MS message to request a restricted area or unknown position waste dump (103). The AIS message will indicate whether the GPS position is unknown or an emergency exists to require the waste dump. If the dumping request is accepted or if it is not accepted (108), but the dumping override is enabled (109), the software 100 determines how much waste needs to be dumped up to the restricted area limit (119). Such situations may exist in the event of an emergency or a loss of AIS radio communication. In such situations, the system 10 can allow the waste dump, but the information will be recorded for the authorities to download and establish whether any fines need to be assessed for the dumping. Otherwise, if un-authorized dumping is not allowed because the vessel is in restricted waters, GPS position is unavailable or AIS radio contact is unavailable, the software 100 denies the dumping operation (109), record the date, time and location of the denied waste dump (120) and keep the shutoff valve 15 enabled and the pump 14 disabled to prevent dumping (104).

Still referring to FIGS. 2 and 3, if the vessel is determined to be outside of restricted waters by the GPS receiver 12 (106), the operator will estimate the volume of waste in the holding tank 18 from the tank level sensor 19 (112), determine the amount of waste to be dumped (114) and enter a command to the system 10 through the user interface 21. The system 10 sends a message through the MS radio 13 to the requisite authorities requesting a waste dump and disclosing the amount to be dumped (116). If the dumping request is accepted and the dump control software 100 receives a positive acknowledgement from the authorities that the requested amount of waste to dump is approved (117) or in case an MS approval cannot be received, but the AIS Message requirement is disabled for unrestricted waters (118), the controller 11 disables the shutoff valve (122) and activates the pump (123) to discharge the requested volume of waste out the drain pipe 17 into the water. A situation to allow unapproved dumping in unrestricted waters (118) may occur if the vessel is determined to be in unrestricted waters by the GPS 12, but is outside AIS radio communications range. The dump control software 100 and controller 11 monitor and measure the amount of waste being dumped while it is pumped via feedback from the tank level sensor 19 and flow meter 16 (124-126). Once the desired amount of waste is dumped, the pump 14 is disabled and the shut off valve 15 is enabled (128-130). The dump control software 100 then records the date, time, location, and quantity of waste dumped from the vessel in the internal memory of the controller 11 and transmits this information to the authorities via the AIS radio 13 (132-134). The system 10 continues to send the AIS dumping information until an acknowledgement of receipt of the transmitted information is received (136). If the controller 11 is configured to not allow dumping within unrestricted waters without approval via the MS radio 13 (118), the controller 11 will record the date, time, and location of the denied request (121), and enable the shutoff valve 15 and disable the pump 14 to prevent dumping (104).

Figure 4:
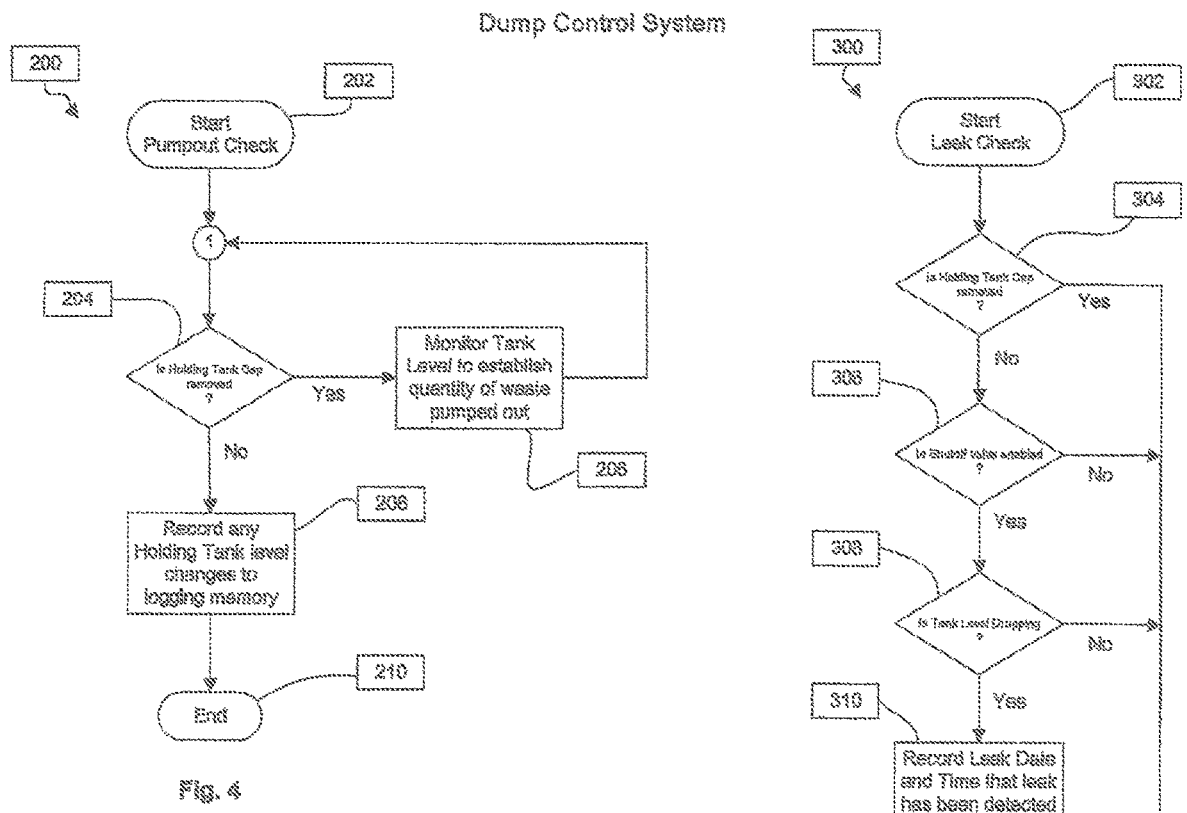
FIG. 4 is a flow diagram of the logic software of the process of the waste water dump control system for determining whether waste in the holding tank is being pumped by a waste management service in accordance with the preferred embodiment of the instant invention.

Now referring to FIG. 4, the holding tank pump monitoring software 200 run by the controller to determine if the holding tank 18 is being pumped out by a waste management service. The controller 11 first determines if the cap on the holding tank 18 has been removed (204) by monitoring the cap lock sensor 20. If it is determined that the cap has been removed then the pump monitoring software 200 monitors the tank level 19 to determine the quantity of waste being pump out of the holding tank 18 (206). Once it is determined that the cap is no longer removed (204), the software 200 records the date, time, location and amount of waste that has been removed from the holding tank and the amount of waste remaining in the holding tank, if any, in the memory of the controller 11 (208). This information will also be transmitted on the MS radio 13 when the system 10 is available.

Figure 5:
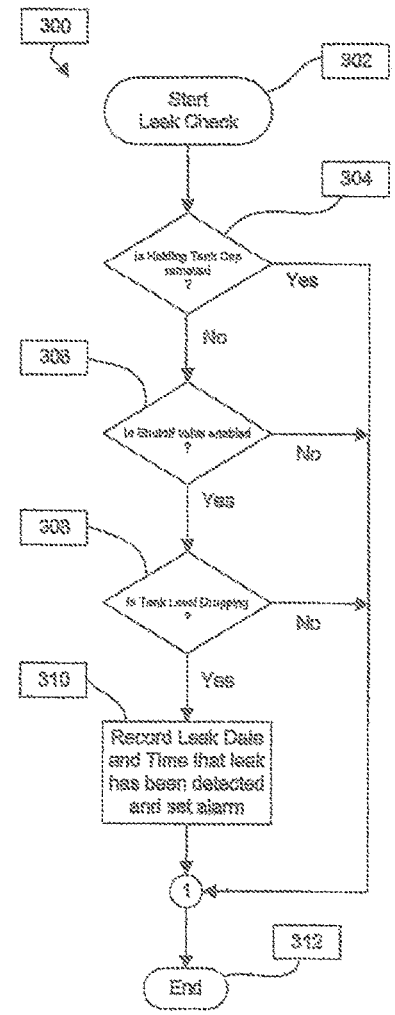
FIG. 5 is a flow diagram of the logic software of the process of the waste water dump control system for determining whether there are any leaks in the holding tank in accordance with the preferred embodiment of the instant invention.

Referring to FIG. 5, the holding tank leak monitoring software 300 is shown. The controller 11 runs the leak monitoring software 300 to determine if there are any leaks in the holding tank (302). The leak monitoring software 300 first determines whether the tank cap is removed (304). If it is determined that the cap is removed, then the leak monitoring software 300 ends (312). If it is determined that the cap has not been removed (304), then the leak monitoring software determines if the shutoff valve 15 is enabled (306) via controller 11 monitoring of the valve 15. If the shutoff valve 15 has not been enabled, then the program 300 ends. If it is determined that the shutoff valve 15 has been enabled, then the leak detection software 300 determines if the tank level is dropping based on signals received by the controller 11 from the tank level sensor 19. If it is not dropping, then the program 300 ends. If it is determined that the level is dropping, a leak is indicated by the tank level dropping without the tank cap having been removed and without the pump 14 having been turned on. The system 10 records the date, time, location and amount of waste that has leaked from the holding tank 18 (310). This information is transmitted on the MS radio 13 to appropriate authorities when the system is available.

Figure 6:
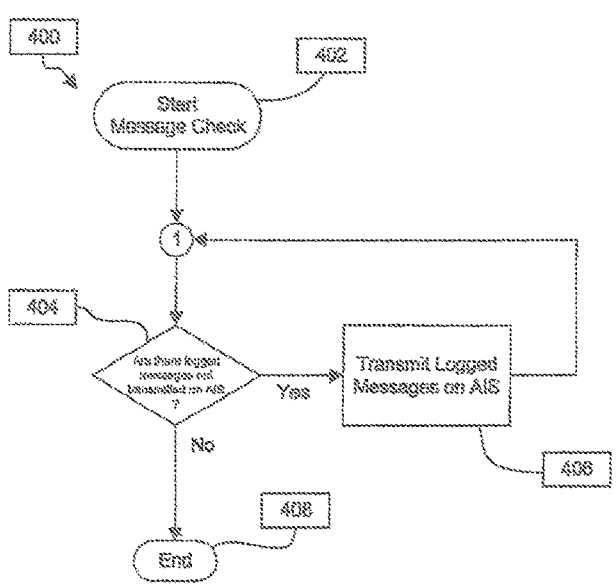
FIG. 6 is a flow diagram of the logic software of the process of the waste water dump control system for determining whether there are any messages that have been recorded but not transmitted in accordance with the preferred embodiment of the instant invention.

With reference to FIG. 6, the message monitoring software 400 illustrates a process that is run in the controller 11 to check if there are any messages that have been recorded that have not been transmitted on the AIS radio 13. First, the message monitoring software 400 is started (402). The software 400 then determines if there are logged messages not transmitted on the AIS radio 13 (404). If there are logged messages not transmitted on the MS radio 13, then the system 10 transmits the logged messages (406). If there are no logged messages, then the program 400 ends (408).

With reference to FIGS. 1-6, the instant invention 10 comprises a marine waste water dump control system 10 that is designed for use on or in nonmetallic water vessels such as fiberglass boats or yachts and therefore does not use acoustic modems that operate in the audible frequency range or 20-200 kHz but rather communication systems. The instant invention 10 provides a system and process that operates in the VHF range for automatically monitoring the time, GPS location, and quantity of waste dumped from a holding tank 18 on a water vessel and for requesting and receiving authorization or disapproval for dumping marine water waste into restricted or unrestricted waters, including blackwater, greywater, bilge water, oil water or other contaminated water or waste. In accordance with the instant invention, the controller 11 and dump control system 100-400 on the water vessel uses an MS (Automatic Information System) or comparable communication system that operates above the audio frequency range, which is typically used by acoustic modems, and in the very high frequency range (VHF 30 MHz-300 MHz), preferably at or proximal the AIS dedicated frequencies of 161.975 MHz or 162.025 MHz to communicate with marine authorities, such as the Coast Guard, before, during and, or after dumping. The dump control system 10 of the instant invention automatically includes memory storage devices as is known in the art for storing all dumping related data for access by authorities at any time in the event a vessel does not include an AIS or a working MS. The instant invention also determines from existing shoreline beacons and a triangulation method the exact distance a water is vessel from shore or the coastline. The system 10 of the instant invention may be applied to any and all holding tanks on a marine vessel containing pollutants such as black water, gray water, bilge water, oil water and similar contaminants.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for controlling and monitoring and seeking the authorization for the dumping of untreated blackwater, greywater, bilge-water or oil-water from a fiberglass boat or yacht, referenced as a marine water vessel, and recording and receiving information from and transmitting data to an authority that regulates offshore dumping regarding the time, location and distance from shore where black water or greywater waste is dumped, said system comprising:
    a microcontroller and microcontroller readable code of instructions for controlling the receipt and transmission of data related to the marine vessel and an untreated black water, greywater, bilge-water or oil-water and processing the data;
    a holding tank for holding untreated black water, greywater, bilge-water or oil-water waste;
    a control valve on said holding tank and in communication with said microcontroller for restricting the ability to purge the waste water from said holding tank until receiving or unless receiving an authorization or override signal;
    a dumping request signal generator in communication with and operated by said microcontroller for generating a dumping request signal adapted for transmission to a predetermined authority empowered to grant or deny permission to dump black water, greywater, bilge water or oil-water waste;
    an override signal generator in communication with and operated by said microcontroller for generating an override signal and microcontroller readable code of instructions for selectively transmitting said override signal to said control valve for opening said control valve to dump said waste water without authorization;
    a user interface, in communication with said microcontroller, for facilitating user interaction with said microcontroller and said data;
    a pump for pumping untreated black water, greywater, bilge-water or oil-water from said holding tank and in communication with said microcontroller for activating and deactivating said pump;
    a modemless tank level sensor, in communication with said holding tank and hard-wired to said microcontroller, for determining the level of untreated black water, greywater, bilge-water or oil-water in said holding tank;
    a pump control means, in communication with said pump, for activating and deactivating said pump to control when untreated black water, greywater, bilge-water or oil-water waste is pumped from said holding tank;
    a beacon communication means, in communication with said microcontroller, for communicating with shore line beacons and determining the exact distance the marine water vessel is from shore; and
    a modemless radio for communication through an automatic information system (AIS) in communication with said microcontroller for automatically sending said dumping request signal to and receiving information from the predetermined authority to seek and receive the authorization signal to dump untreated black water, greywater, bilge-water or oil-water from said holding tank on the marine water vessel and for transmitting untreated black water, grey water, bilge-water or oil-water data from the marine water vessel to the predetermined authority regarding the time, location and distance from shore where untreated black water, greywater, bilge-water or oil-water is dumped or is to be dumped, said AIS operating at frequencies between 30 MHz and 300 MHz.

2. A system as recited in claim 1, further comprising:
    a global positioning system in communication with said microcontroller for determining the relative location of the marine water vessel.

3. A system as recited in claim 1, further comprising a flow meter in communication with said microcontroller and said holding tank for determining the rate of flow and amount of untreated black water, greywater discharged from said holding tank.

4. A system as recited in claim 1, further comprising:
    the pump control means being in communication with said microcontroller and said holding tank for controlling said pump and pumping black water, greywater, bilge-water or oil-water from said holding tank.

5. A system as recited in claim 1, further comprising:
    a shut off valve means, in communication with said microcontroller and said holding tank, for controlling the shut off of said pump.

6. A system as recited in claim 1, further comprising:
    a cap removably mounted to said holding tank for concealing the untreated black water, greywater, bilgewater or oil-water in said holding tank; and
    a cap removal detection means, in communication with said microcontroller and said holding tank, for controlling and communicating whether said cap has been removed.

7. A system as recited in claim 6, further comprising:
    a shut off valve means, in communication with said microcontroller and said holding tank, for controlling the shut off of said pump.

8. A system for controlling and monitoring the dumping of untreated blackwater, greywater, bilge-water or oil-water waste from a fiberglass boat or yacht, referenced as a marine water vessel (waste water) and recording and transmitting data to a predetermined authority regarding the time, location and distance from shore where black water or greywater waste is dumped, said system comprising:
- a position measuring device to locate the global position of the marine water vessel;
- a microprocessor and microprocessor readable code of instructions processed by said microprocessor for controlling and monitoring the dumping of waste water;
- a holding tank for holding the waste water;
- a flow sensor for measuring the flow of the waste water from the marine water vessel;
- a modemless level sensor for measuring the amount of the waste water in a holding tank;
- a control valve in communication with said holding tank and said microprocessor for restricting the ability to purge the waste water from said holding tank;
- a dumping request signal generator in communication with and operated by said microcontroller for generating a dumping request signal adapted for transmission to a predetermined authority empowered to grant or deny permission to dump black water, greywater, bilge water or oil-water waste;
- an override signal generator in communication with and operated by said microprocessor for generating an override signal and microprocessor readable code of instructions for selectively sending said override signal to said control valve for opening said control valve to dump said waste water in emergency situation when dumping is not authorized; and
- a modemless radio for communication through an automatic information system (AIS) in communication with said microcontroller for automatically sending said dumping request signal to and receiving information from the predetermined authority to seek and receive an authorization signal to dump waste water data on the marine vessel and transmitting said waste water data from the marine water vessel to the predetermined authority regarding the time, location and distance from shore where the waste water is dumped or is to be dumped, said AIS operating at frequencies between 30 MHz and 300 MHz.

9. A system as recited in claim 8, further comprising a means for monitoring the flow of waste water from the marine vessel.

10. A system as recited in claim 8, further comprising a means for controlling the restriction of the waste water flow from the marine vessel.

11. A system as recited in claim 8, further comprising a means for controlling the flow of the water waste from said holding tank based on the water vessel distance from land.

12. A system as recited in claim 8, further comprising a means for reporting any unauthorized dumping of the waste water from the marine vessel within a prohibited distance from land.

13. A method for controlling and monitoring the dumping of untreated blackwater, greywater, bilge-water, or oil-water from a fiberglass boat or yacht, referenced as a marine vessel and recording and transmitting data to a predetermined authority regarding the time, location and distance from shore where the black water, greywater, bilge-water or oil-water is dumped into ocean or sea water, said method comprising the steps of:
- (a) enabling a shut off valve on a black water, greywater, bilge-water or oil-water holding tank and disabling a pump to prevent the black water, greywater, bilge-water or oil-water from being pumped out of said holding tank and dumped into water;
- (b) providing a microcontroller and a processor readable code of instructions readable and processed by said microcontroller for determining a level of black water, greywater waste in a holding tank, controlling a pump in communication with said holding tank for pumping the black water or greywater waste from said holding tank into ocean or sea water, determining where black water or greywater waste is dumped into ocean or sea water and determining an amount of black water, greywater, bilge-water or oil-water pumped from said holding tank;
- (c) using GPS, in communication with said microcontroller and processor readable code of instructions, for determining a location of the marine vessel relative to a shoreline;
- (d) ascertaining with said GPS, said microcontroller and said processor readable code of instructions when a marine vessel is a predetermined approved distance from the shoreline for legal dumping into the ocean or sea water;
- (e) generating a dumping request signal for transmission to a predetermined authority empowered to grant or deny permission to dump black water, greywater, bilge water or oil-water waste;
- (e) providing a radio for communicating through an Automatic Identification System (AIS) in communication with said microcontroller for automatically sending said dumping request signal to and receiving information from the predetermined authority to receive or grant permission to dump untreated black water, grey water, bilge-water or oil-water data from said holding tank on the marine vessel and for transmitting untreated black water, greywater, bilge-water or oil-water data to the predetermined authority regarding the time, location and distance from shore where untreated black water, greywater, bilge-water or oil-water is to be dumped and to request a dumping authorization from the predetermined authority for the dumping of black water, greywater, bilge-water or oil-water from the said holding tank and for communicating the location and amount of black water, greywater, bilge-water or oil-water dumped from the said holding tank when dumping is completed;
- (f) seeking authorization from a predetermined authority to dump black water, greywater, bilge-water or oil-water by sending said dumping request signal from said radio to dump black water, greywater, bilge-water or oil-water from said holding tank;
- (g) sending a signal from a computer for disabling said shut off valve and activating said pump when a dumping is authorized by the predetermined authority; and
- (h) sending a data signal from said radio to the predetermined authority comprising the amount of black water or greywater waste dumped and the location of where the black water or greywater was dumped; said microcontroller and processor code of instructions generating an override signal in emergency situations that necessitate dumping and transmitting said override signal to said shut off valve to disable said shut off valve allowing dumping without authorization.

14. A method as recited in claim 13, further comprising the steps of:
- (i) enabling a dumping override when dumping is not approved by the authority but is required due to an emergency situation or loss of AIS communication; and (j) determining how much black water or grey water waste needs to be dumped from the water vessel holding tank.

15. A method as recited in claim 14, further comprising the steps of:
- (k) enabling said shut off valve and deactivating said pump when the dumping is completed;
- (l) recording the date, time, location and quantity of black water or greywater dumped; and
- (m) sending an MS message to the predetermined authority of the amount of black water or greywater dumped.

16. A method as recited in claim 13, further comprising the step of:
- (i) enabling said shut off valve and deactivating said pump when the dumping is completed;
- (j) recording the date, time, location and quantity of black water or greywater dumped; and
- (k) sending an MS message to the predetermined authority of the amount of black water or greywater dumped.

17. A method as recited in claim 13, further comprising the steps of:
- (i) checking said pump;
- (j) determining whether a cap is removed from said holding tank;
- (k) monitoring the level of black water or greywater waste in said holding tank to establish the quantity of waste pumped out of said tank when said cap is determined to be removed; and
- (l) recording any changes in the level of black water or greywater waste in said holding tank and logging said changes to a memory in communication with said microcontroller when said cap is determined to be on said holding tank.

18. A method as recited in claim 13, further comprising the steps of:
- (i) performing a holding tank leak test;
- (j) determining whether a cap is removed from said holding tank;
- (k) ending said leak test if said cap is determined to have been removed;
- (l) ascertaining whether the level of black water or greywater waste in said holding tank is dropping;
- (m) ending said leak test if it is ascertained that the level of black water or greywater water waste has not dropped; and
- (n) recording the date and time that a leak has been detected and setting an alarm if it is ascertained that the level of black water or greywater waste has dropped.

* * * * *